Oct. 8, 1940.    A. BARNSTEINER ET AL    2,217,465
HEATER UNIT
Filed Aug. 27, 1938    2 Sheets-Sheet 1
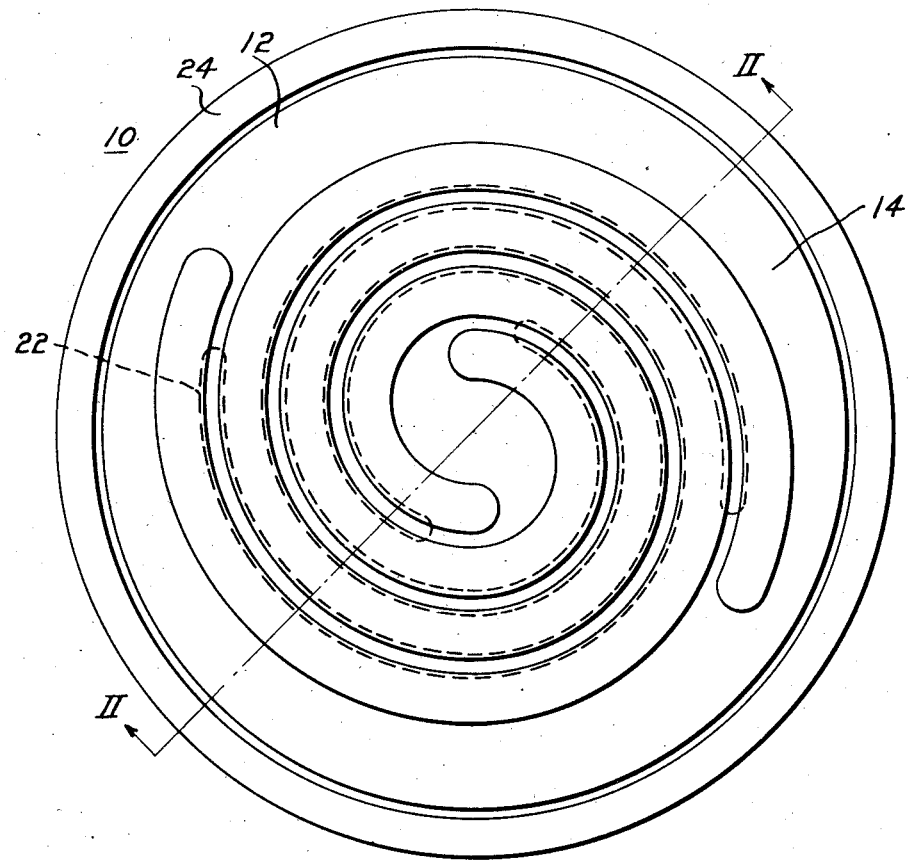
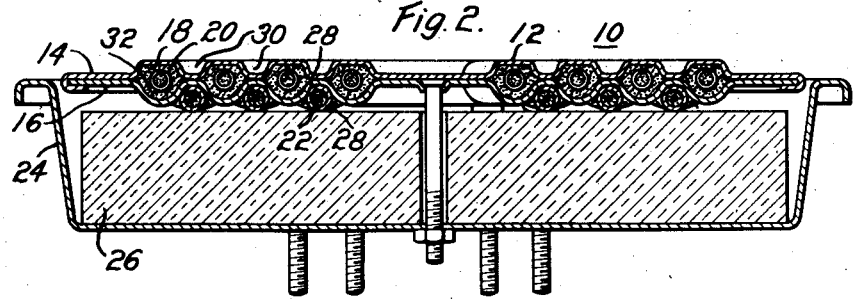
WITNESSES:
Wm. B. Sellers
H. C. Hepler
INVENTORS
Alfons Barnsteiner and
Edwin H. Lockwood.
BY
W. R. Coley
ATTORNEY

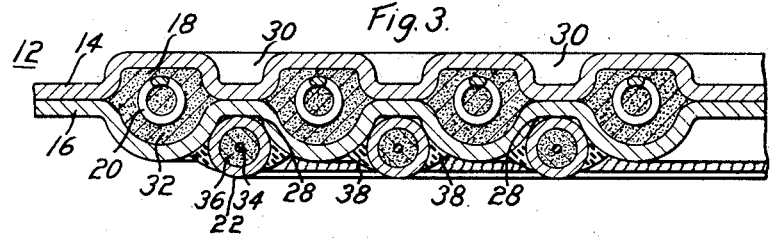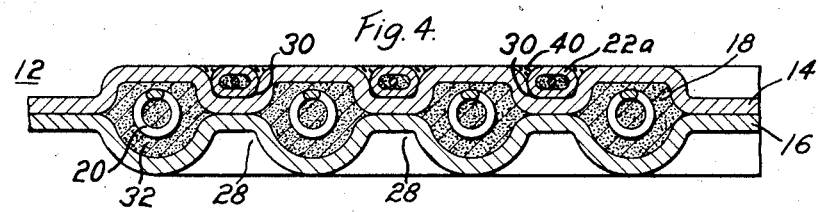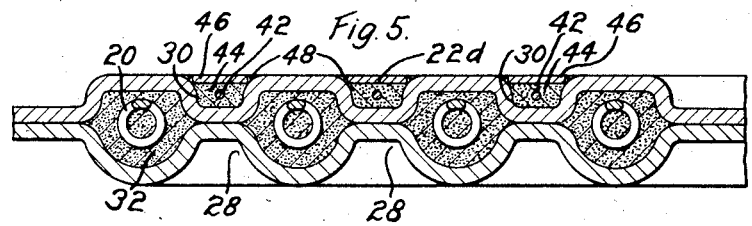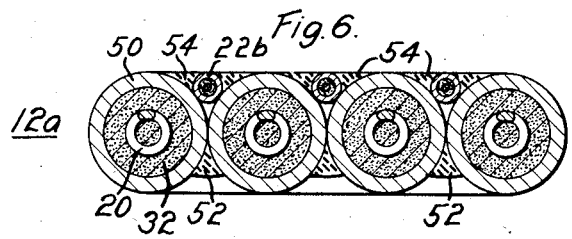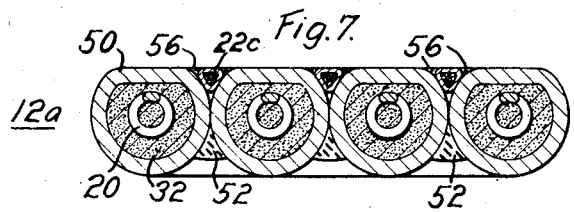

Patented Oct. 8, 1940

2,217,465

UNITED STATES PATENT OFFICE 2,217,465

HEATER UNIT

Alfons Barnsteiner and Edwin H. Lockwood, Mansfield, Ohio, assignors to Westinghouse Electric & Manufacturing Company, East Pittsburgh, Pa., a corporation of Pennsylvania Application August 27, 1938, Serial No. 227,084

6 Claims. (Cl. 219—37)

Our invention relates to heater units and more particularly to an enclosed range surface unit having a separate simmer heating coil.

Simmer heating or extra-low-heat operation of range surface units is rapidly becoming a universal application upon ranges. In some cases, however, this low heat operation is obtained electrically by an unbalanced connection of the heating elements which necessitates the use of an over-voltage materially above the recognized relatively safe standard voltage used for regular household appliances. With such arrangements the low heat connection, due to the requirements of specific heating coils for the desired high or operating temperatures thereof, produce such extremely low "low heats" as to be practically useless after a relatively long period of operation. In addition, the use of the main heating coils, with the various unbalanced connections, produces only a few limited low heat values which cannot be changed without materially changing the regular high operating values of the unit so as to reduce its operating efficiency. Further, the use of such unbalanced units requires the added expense of extra insulating material so as to adequately insulate the units for the required over-voltage.

It is, therefore, an object of our invention to provide a range surface unit having a separate simmer heater integrally attached to and in thermal communication with the main heater coils so as to permit the main coils to be operated with a favorable balanced connection and thereby permit such unit to be operated with the relatively safe standard house voltage.

In some surface units known to the art, the simmer heat is an extra low heat supplied in a relatively small portion of the total cooking surface of the unit by a portion thereof. In other cases, a separate heating coil is used which will be relatively cool with respect to the main heating coils. Such methods of supplying heat to a vessel placed upon the unit is very unsatisfactory in that only a portion thereof is receiving heat.

It is, therefore, a further object of our invention to provide a range surface unit having a simmer heating coil intimately associated therewith which will increase in temperature with the main heating coils and which, when operated independently in the "simmer" position, will deliver heat uniformly over substantially the entire cooking surface of the unit.

A further object of our invention is to provide a range surface unit with a separate simmer heater coil assembled functionally integral therewith, and a method of attaching such simmer heater coil to the range surface unit.

A still further object of our invention is to provide a coiled tubular or plate-type range surface unit having an inherently uneven surface and a simmer heater coil insulated from and rigidly attached to the unit so as to substantially fill the open spaces of the unit whereby heat from the simmer coil will be transmitted to the unit and to a vessel placed upon the unit.

Another object of our invention is to provide a coiled tubular or plate-type range surface unit having an inherently uneven surface and a simmer heater coil insulated from and rigidly attached to the unit so as to substantially fill the open spaces of the unit to form a substantially flat-surfaced cooking surface.

Other objects of our invention will either be pointed out specifically in the course of the following description of one form of device embodying our invention, or will be apparent from such description.

In the accompanying drawings:

Figure 1 is a top plan view of a device embodying our invention;

Fig. 2 is a sectional view taken along the line II—II of Fig. 1;

Fig. 3 is an enlarged fragmentary sectional view similar to Fig. 2;

Figs. 4 and 5 are views similar to Fig. 3, illustrating modified forms of the simmer heater and indicating the method for attaching such heater to the main unit; and Figs. 6 and 7 are views similar to Fig. 3 illustrating a modified form of the device shown in Fig. 1, illustrating various methods of attaching the simmer heater coil thereto.

Referring to Figs. 1 to 3, inclusive, of the accompanying drawings, we show an enclosed range surface unit or heating unit 10 comprising a main electric heater 12 including two registering complementary plates 14 and 16 having spirally wound spaced convolutions or embossed portions forming an elongated passage 18, a main resistor 20 positioned therein and insulated therefrom, and a metallic-sheathed elongated simmer-heat electric heater 22 rigidly attached to and operatively associated with the main heating element 12. The unit 10 is supported by a suitable supporting pan 24 and may be thermally insulated therefrom by any suitable insulating material 26.

The main heater 12 comprises in this instance complementary spirally grooved or embossed plates 14 and 16 which, when placed in face to face relationship, form spaced convolutions resulting in an elongated passage therebetween. In addition to the spirally shaped elongated passage between the plates 14 and 16, spirally shaped external grooves 28 and 30 will be located intermediate the adjacent convolutions of the elongated passage 18, the grooves 28 being positioned within the lower plate 16 while the grooves 30 are positioned within the upper plate 14. A main resistor 20 is positioned within the elongated passage 18 and is insulated from the inner walls thereof by means of any suitable insulating material 32, such as magnesium oxide. It is to be understood that the method of making the main heater or positioning the resistor therein is not to be included as a part of this invention.

The simmer heater 22 is formed of an elongated metallic sheath within which a resistor 34 is insulatedly positioned in any well known manner by means of, say, magnesium oxide 36. The metallic sheath elongated simmer heater 22 is then wound into spiral convolutions which are of substantially the same curvature as the grooves 28 and 30, permitting the simmer heater 22 to be readily positioned within either a groove 28 or a groove 30, depending upon whether it be desired to position the heater below or above the main heater 12.

It is preferred that the simmer heater be positioned within the lower groove 28 substantially in contact with adjacent convolutions of the elongated passage 18 so as to be in physical contact therewith and to respond in temperature with variations in the main resistor 20. A suitable welding or brazing material 38 may be positioned between the adjacent exterior walls of the elongated passages 18 and the outer surface of the metallic sheathed simmer heater 22 so as to rigidly attach the simmer heater 22 to the lower plate 16 in the heater element 12. The welding or brazing material 38 will then aid in maintaining a uniform temperature between the main heater 12 and the simmer heater 22 as well as aiding in an efficient thermal communication therebetween.

If desired, the simmer heater 22 may be substantially flat, as shown by 22a in Fig. 4, to permit the simmer heater to be positioned within the upper groove 30 and to have its upper surface substantially in the plane of the upper surface of the elongated passage 18. The simmer heater 22a may then be rigidly attached to the upper plate 14 of the main heater 12 by having any suitable heat conducting welding or brazing body 40 positioned within the groove 30 between the simmer heater 22a and the adjacent exterior surface of the elongated passages 18.

It, therefore, allows that inasmuch as the top surface of the simmer heater 22a is on substantially the same level as the top surface of the elongated passage 18 and that the voids therebetween are filled by suitable welding and heat-conducting material 40, the range surface unit formed in such a manner will have substantially a flat top cooking surface.

It is obvious, however, that the shape of the simmer heater 22a need not be elliptical but may be of any shape desired depending upon the shape of the top groove 30 and the amount of the weld material desired to be used. With the simmer heater 22a positioned within the upper groove 30 and the voids filled with a heat-conducting material, it is obvious that the temperature of the simmer heater 12 will be substantially the same as that of the main heater and will follow any temperature variations thereof.

In addition, it is obvious that when the simmer heater coil 22 or 22a is connected to a power supply (not shown), that due to the juxtaposition of such simmer heater and the main heater, the temperature of the main heater will be substantially the same as that of the simmer heater, whether or not power is supplied to the main heater, and that the temperature of the top surface of the unit 10 will be substantially uniform.

If desired and as shown in Fig. 5, a simmer heat resistor 42 may be loosely positioned within, say, the upper groove 30 and may be insulated therefrom in any suitable manner, such as by magnesium oxide 44. The resistor 42 and the insulating material 44 may be retained within the groove 30 by means of a spiral cover strip 46. The strip 46 is positioned within the groove 30 and rests upon the exterior walls of the adjacent convolutions of the elongated passages 18 so as to rigidly retain the resistor 42 and insulating material 44, constituting a simmer heater 22d, within the groove 30. The spiral strip 46 may be rigidly attached to the exterior surface of the elongated passages 18 by being welded or brazed thereto substantially as shown at 48 in Fig. 5. The spiral strip 46 may be positioned substantially in the plane of the top surface of the upper portion of the elongated passage 18 so as to form substantially a flat cooking surface for the range surface unit 10.

With the simmer heater positioned in such a manner, it is apparent that the heat developed by the main heater 12 will be conducted to the simmer heater, resulting in the simmer heater being substantially the same temperature as the main heater 12, and likewise, as hereinabove described, as the simmer heater is attached to a power supply, the heat produced thereby will be uniformly distributed to the top surface of the surface unit 10 by being conducted directly to the strip 46 through the walls of the elongated passage 18.

As a further modified construction the range surface unit 10 and the main heater 12a of the surface unit 10 may be formed by spirally winding one or more elongated enclosed or sheathed tubular main heating bodies 50, as shown in Figs. 6 and 7. The elongated sheathed main heating bodies 50, having either a round or flat top surface, as shown in Figs. 6 and 7, respectively, are spirally wound about a common axis so as to form a groove between the adjacent convolutions thereof. In addition, the adjacent convolutions may be rigidly attached together in any suitable manner such as by brazing or spot welding in the grooves on the underside, as shown at 52 in Figs. 6 and 7. A simmer heater coil 22b positioned within an elongated metallic sheath, somewhat smaller in diameter than the simmer coil 22 as hereinabove described, may then be positioned within the top groove between the adjacent convolutions of the enclosed main heating body 50 and a suitable weld or braze material 54 may then be positioned therebetween so as to rigidly include the simmer heater body and the main heating body in a functionally integral unit.

If desired, the top surface of the small tubular simmer heater coil may be flattened or deformed in a substantially triangular cross-section, as shown at 22c (Fig. 7) and may be positioned within the upper groove located between the adjacent convolutions of the main heater body so as to be substantially in line with the top surface of the main heating body. The simmer heater coil 22c may then be rigidly attached to heating coils 50 by means of a suitable welding and heat-conducting body 56 as shown in Fig. 7. It is, therefore, obvious that the range surface unit 10 formed in such a manner will have substantially a flat top cooking surface and that the main heater body 50 and simmer heater body 22b or 22c will be in good thermal communication therewith so that the respective temperatures of their exterior surfaces will be substantially the same irrespective of which one of the two is operatively associated with a suitable power supply.

It is further obvious that the devices embodying our invention provide a range surface unit having a main heater and a simmer heater intimately associated therewith so as to have substantially the same temperature at their exterior surfaces and so that the simmer heater delivers heat uniformly over substantially the whole cooking surface when operated independently.

It will be understood that the main heater is adapted to maintain an operating temperature of the range surface unit above the boiling temperature, and that the simmer-heat electric heater is adapted to independently maintain a temperature of the unit below that of the main heater. It is preferred that such simmer-heat heater be adapted to maintain the temperature of the unit at substantially the boiling temperature or lower, depending upon the desired capacity thereof.

The simmer-heat heaters 22, 22a, 22b, 22c and 22d, positioned intermediate the main heaters and rigidly attached thereto as hereinabove described, when assembled with the main heaters form relatively thin functionally integral structures capable of being maintained at substantially a uniform temperature by either of the heater resistors.

Various other modifications may be made in the device embodying our invention without departing from the spirit and scope thereof, and we desire, therefore, that only such limitations shall be placed thereon as are imposed by the prior art and the appended claims.

We claim as our invention:

1. An enclosed electric heating unit comprising a pair of registering metal plates, at least one having a recess therein, a main heater resistor in the recess, a metallic-sheathed simmer-heat heater positioned exterior to and intimately associated with the recessed plate, said sheathed-heater welded to the outside surface of the plate adjacent the recess so as to form a functionally integral structure therewith.

2. An enclosed electric heating unit comprising a pair of complementarily spirally-grooved plates positioned in face-to-face relationship, at least one main electric heater resistor positioned between the plates within the groove, a metallic-sheathed simmer-heat heater positioned exterior to said plates intermediate the grooves and rigidly attached thereto to form a relatively thin functionally integral structure capable of being maintained at substantially a uniform temperature by the heaters.

3. An enclosed electric heating unit comprising a pair of complementarily spirally-grooved plates forming spaced embossed portions positioned in face-to-face relationship to form an elongated passage therebetween with a spirally-shaped groove located intermediate adjacent embossed portions of the passage, a main heater resistor positioned between the plates within the passage, a partially-flattened metallic-sheathed simmer-heat heater positioned within the groove, and means for rigidly attaching the simmer-heat heater to the walls of the passage and for forming a substantially flat heating surface.

4. A heating unit comprising a pair of registering plates, at least one having spaced embossed portions positioned therein, to form an elongated enclosed passage between the plates and a spirally-shaped open groove upon said one plate, a main heater resistor in the elongated passage, a simmer-heat heater positioned within the open groove, and a spiral strip rigidly attached to the exterior surface of adjacent embossed portions for retaining the simmer heater within the groove and in thermal communication with the main heater resistor.

5. A heating unit comprising a spirally-wound elongated enclosed main heating body, the convolutions thereof forming a groove therebetween, a spirally-wound elongated enclosed simmer-heating body positioned within the groove and means including a weld body cooperating with the convolutions of the bodies for rigidly attaching them together to form a functionally integral unit.

6. A heating unit comprising a spirally-wound elongated enclosed main heating body, the convolutions thereof forming a groove therebetween, a flattened spirally-wound elongated enclosed simmer-heating body positioned within the groove with the flat surface thereof substantially in line with top surface of the main heating body, and a heat conducting body of weld material positioned between the bodies within the groove for rigidly attaching the convolutions of the main body and the simmer-heating body together into a functionally integral unit and for forming substantially a flat surface.

ALFONS BARNSTEINER.
EDWIN H. LOCKWOOD.